(12) United States Patent
Russo et al.

(10) Patent No.: US 8,090,775 B2
(45) Date of Patent: *Jan. 3, 2012

(54) TIME LIMITED COLLABORATIVE COMMUNITY ROLE DELEGATION POLICY

(75) Inventors: Joseph A. Russo, Westford, MA (US); Robert Yates, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 600 days.

This patent is subject to a terminal disclaimer.

(21) Appl. No.: 12/143,497

(22) Filed: Jun. 20, 2008

(65) Prior Publication Data

US 2008/0250022 A1 Oct. 9, 2008

Related U.S. Application Data

(62) Division of application No. 10/732,683, filed on Dec. 10, 2003, now Pat. No. 7,415,498.

(51) Int. Cl.
*G06F 15/16* (2006.01)

(52) U.S. Cl. ........................................ 709/204; 709/205

(58) Field of Classification Search ........... 709/204–205
See application file for complete search history.

(56) References Cited

U.S. PATENT DOCUMENTS

| 7,415,498 B2 * | 8/2008 | Russo et al. ............ 709/204 |
| 2004/0153509 A1 * | 8/2004 | Alcorn et al. ........... 709/205 |
| 2005/0125277 A1 * | 6/2005 | Estrada et al. ............ 705/9 |

* cited by examiner

*Primary Examiner* — Krisna Lim
(74) *Attorney, Agent, or Firm* — Steven M. Greenberg, Esq.; Carey, Rodriguez, Greenberg & O'Keefe

(57) ABSTRACT

A system for establishing and maintaining a permission delegation policy for roles within a collaborative computing environment provides a list of potential delegatee end user persons to a delegator end user person. A list of delegatable permissions is provided to the delegator end user person in which the list of delegatable permissions correspond to permissions held by the delegator end user person. A delegation policy is received from the delegator end user person. The delegation policy includes one or more delegated permissions from the list of delegatable permissions and identification of a delegatee end user person from the list of potential delegatee end users persons designated to receive the delegated permissions.

11 Claims, 3 Drawing Sheets

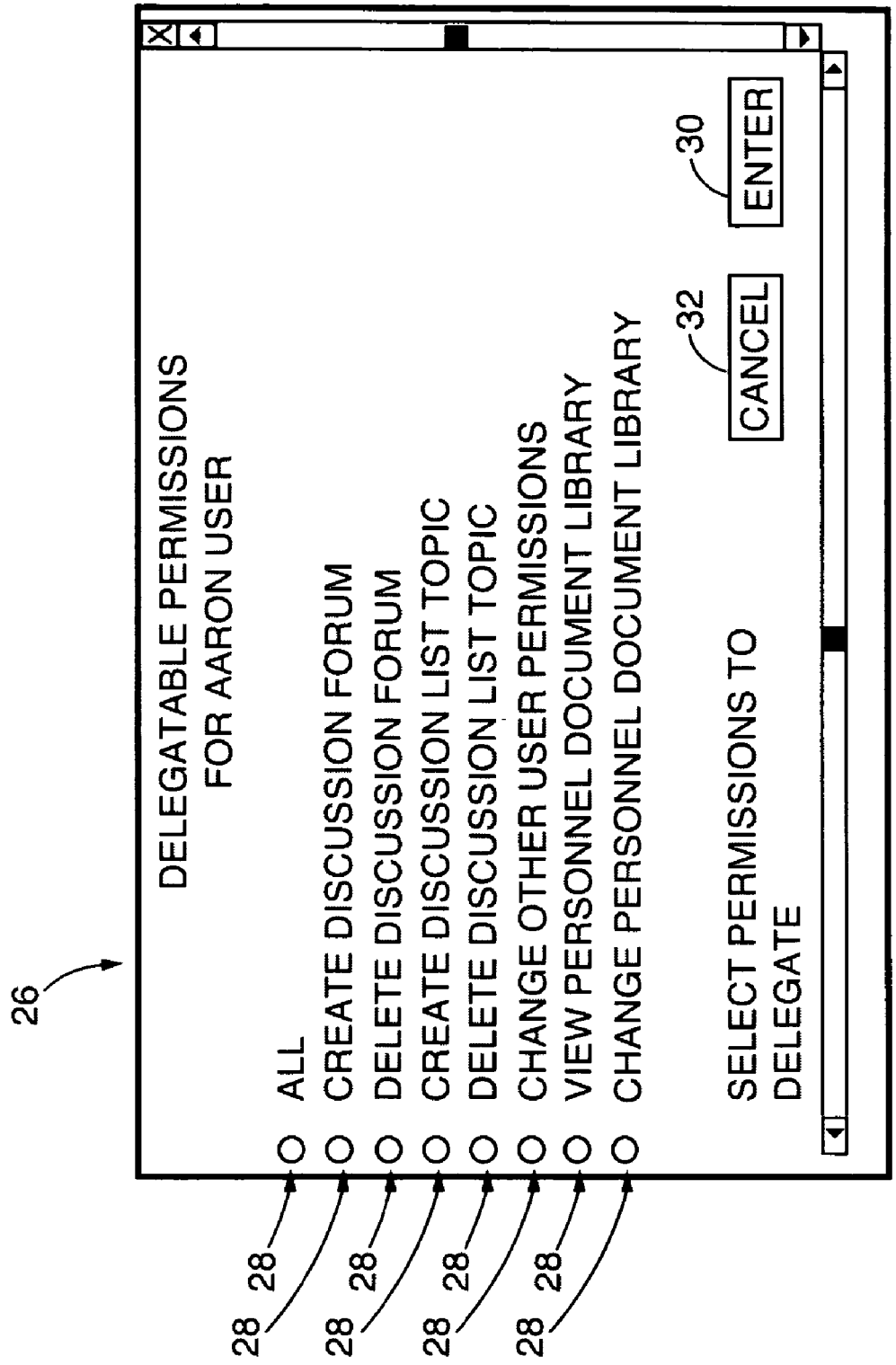

TIME LIMITED COLLABORATIVE COMMUNITY ROLE DELEGATION POLICY

CROSS-REFERENCE TO RELATED APPLICATIONS

This application is a Divisional of U.S. application Ser. No. 10/732,683, filed on Dec. 10, 2003, now U.S. Pat. No. 7,415,498, the teachings of which are incorporated herein by reference in its entirety.

BACKGROUND OF THE INVENTION

1. Statement of the Technical Field

The present invention relates to collaborative computing environments and, in particular, to the implementation and support of role delegation among users in a collaborative computing environment community.

2. Description of the Related Art

Collaborative computing provides a means for users to pool their strengths and experiences to achieve a common goal. For example, a common goal may be an educational objective, the completion of a software development project or even creation and use of a system to manage human resources. The establishment of a collaborative computing environment typically involves the creation or definition of a community. The community provides the framework under which the collaborative computing objective is achieved.

A collaborative computing community is defined by (1) a particular context, i.e. the objective of the community, (2) membership, i.e., the participants in the community, and (3) a set of roles for the community members. Roles are names given to the people in the community which dictate access to the community's resources and tools as well as define the behavior of the community members. Community creators or administrators may desire that roles have specific access and policy attributes for the different business components, i.e. tools, resources, etc. within the community.

For example, consider a community relating to a document management system where members of the community are collaborating to write a document. Roles within the community may include readers who have view-only access to documents within the community, authors who have reader permissions plus permission to create new documents and edit existing documents, and managers who have author privileges plus document deletion privileges as well as privilege to assign community roles, set task deadlines and approve submitted documents. A problem is encountered when users having certain roles, such as the manager-level role or the author role will be away from the community and need to delegate their role responsibilities to another user.

In current collaborative computing systems, users in roles having appropriate authority (delegators) can promote other users (delegatees) into the promoting user's role. This can be problematic because the promoting user may not want the promoted user to have the entire set of permissions and authorities available to the promoting user. Further, once the promotion has been made, the promoting user has to remember that he/she has promoted the other user in order to delegate responsibilities and must therefore remember to demote the promoted user at the appropriate point in the future.

In other collaborative computing systems, once a user has delegated his or her responsibilities, the user cannot get the responsibilities/role back without specific relinquishment from the user to whom the role was delegated. This is the case, for example, where the delegating user was the only user with administrator-level authority within a particular community.

These scenarios do not reflect real world responsibility delegation practices. In the real world, a person, such as a manager, delegates certain responsibilities to others during the period of the person's absence. For example, a manager who is taking a short vacation may wish to delegate decision making responsibilities for a particular project to one person, responsibilities for another project to another person, while not wanting to delegate personnel responsibilities to anyone. It is desirable to have a collaborative computing system which overcomes the above-described deficiencies and which provides a mechanism for temporary role delegation in which a subset of the privileges within the role can be delegated.

SUMMARY OF THE INVENTION

The present invention addresses the deficiencies of the art in respect to supporting temporary delegation of roles, i.e. responsibilities, within a collaborative computing environment community and provides a novel and non-obvious method and system for community role delegation policy implementation and support.

Methods consistent with the present invention provide a method for delegating permissions in a collaborative computing environment, in which a list of potential delegatee end user persons is provided to a delegator end user person. A list of delegatable permissions is provided to the delegator end user person, the list of delegatable permissions corresponding to permissions held by the delegator end user person. A delegation policy is received from the delegator end user person, the delegation policy including one or more delegated permissions from the list of delegatable permissions and identification of a delegatee end user person from the list of potential delegatee end users persons designated to receive the delegated permissions.

Systems consistent with the present invention include a system for permission delegation in a networked collaborative computing environment which has a delegator workstation and a collaborative com utin server in data communication with the delegator workstation via the network. The collaborative computing server provides a list of potential delegatee end user persons to the delegator workstation and provides a list of delegatable permissions to the delegator workstation. The list of delegatable permissions corresponds to permissions held by a delegator end user person. The collaborative computing server also receives a delegation policy from the delegator workstation. The delegation policy includes one or more delegated permissions from the list of delegatable permissions and identification of a delegatee end user person from the list of potential delegatee end users persons designated to receive the delegated permissions.

In accordance with another aspect, the present invention provides a computer-readable storage medium storing a computer program which when executed performs a collaborative computing permission delegation method in which a list of potential delegatee end user persons is provided to a delegator end user person. A list of delegatable permissions is provided to the delegator end user person. The list of delegatable permissions corresponds to permissions held by the delegator end user person. A delegation policy is received from the delegator end user person. The delegation policy includes one or more delegated permissions from the list of delegatable permissions and identification of a delegatee end user person from the list of potential delegatee end users persons designated to receive the delegated permissions.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 4 is an exemplary delegatable privileges selection computer screen display.

DETAILED DESCRIPTION OF THE PREFERRED EMBODIMENTS

Figure 1:
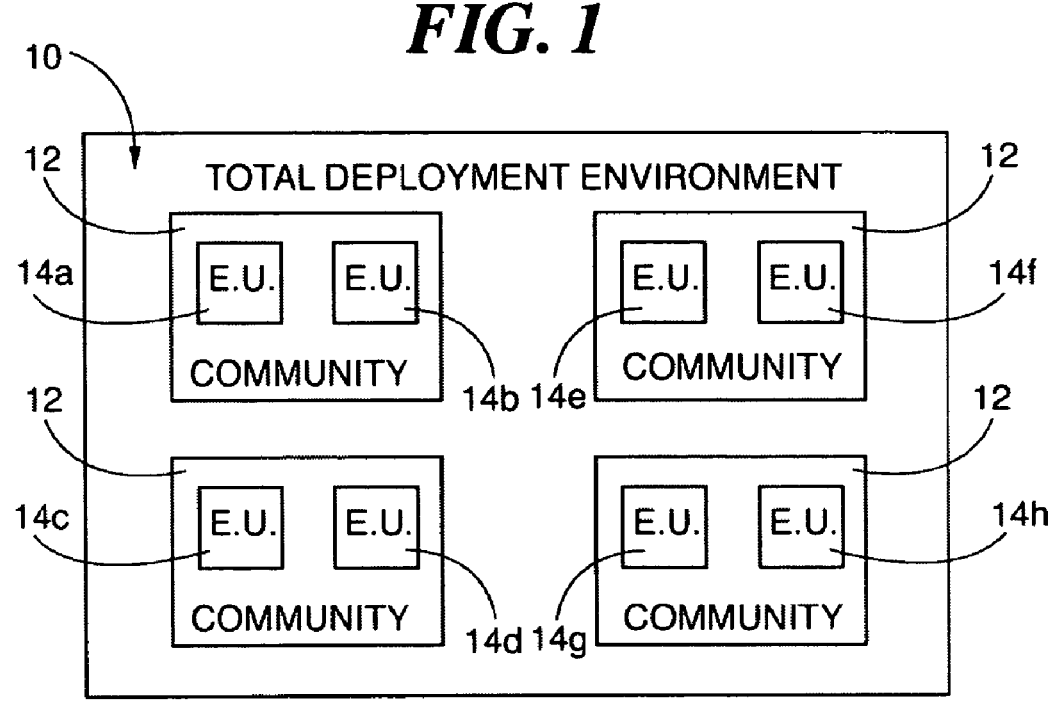
FIG. 1 is a block diagram of a hierarchy of a typical collaborative computing deployment environment constructed in accordance with the principles of the present invention.

The present invention is a method and system for delegating responsibilities within collaborative computing environment communities. Initially, it is noted that the terms "permissions" and "responsibilities" are used interchangeably herein and refer generally to the delegator's resource access permissions and ability to control access to resources by other users. Referring now to the drawing figures in which like reference designators refer to like elements, there is shown in FIG. 1 a block diagram of a hierarchy of a typical collaborative computing deployment environment constructed in accordance with the principles of the present invention and designated generally as 10. Each collaborative computing deployment environment 10 includes one or more communities 12 which in turn are accessible by one or more end user persons 14a-14h (referred to collectively herein as end user persons 14), i.e. members of the community. Each community 12 represents a collaborative computing community provided within total collaborative computing deployment environment 10.

End user persons 14 are assigned roles within their respective communities. For example, the context of a community may be that of a software development collaborative computing environment and may include roles such as development manager, architect and software developer. The roles of manager, architect and software developer may have different responsibilities and privileges within the community. End user person 14a may need to delegate a subset or the entirety of the responsibilities and privileges corresponding to their role to another end user person 14 such as end user person 14b.

Figure 2:
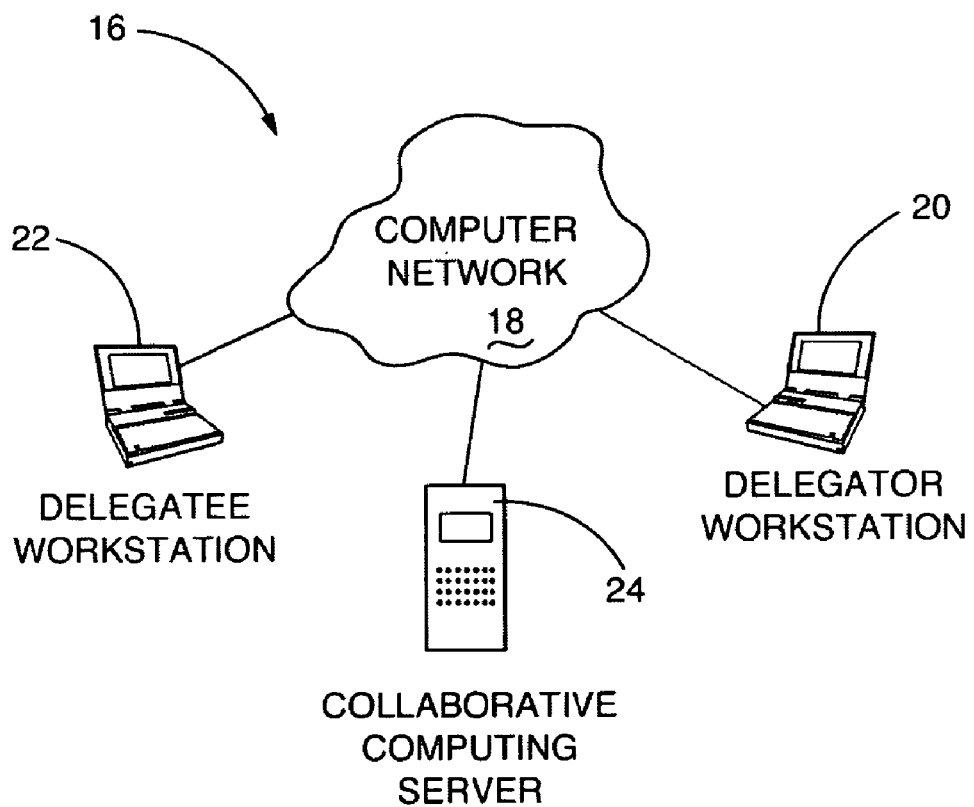
FIG. 2 is an iconic diagram of a collaborative computing system constructed in accordance with the principles of the present invention.

A collaborative computing system constructed in accordance with the principles of the present invention is explained with reference to FIG. 2. Delegation system 16 includes computer network 18 to which is coupled delegator workstation 20, delegatee workstation 22 and collaborative computing server 24. Computer network 18 can be any network known in the art for facilitating the transmission of information from one computing device to another using any known communication protocol.

Delegator workstation 20, delegatee workstation 22 and collaborative computing server 24 can be any computing devices capable of performing the functions described herein. For example, a typical combination of hardware and software could be a general purpose computer having a central processing unit and a computer program stored on a storage medium that, when loaded and executed, controls the computer system such that it carries out the methods and functions described herein. The present invention can also be embedded in one or more computer program products which comprise all the features enabling the implementation of the methods described herein, and which, when loaded in a computer system is able to carry out these methods. The storage medium can be any volatile or non-volatile storage device.

Delegator workstation 20 and delegatee workstation 20 can, for example, be any microprocessor-based computing device such as a desktop or laptop computer, personal digital assistant (PDA), hand held computer, etc. running any suitable operating system and providing the user with a display and input device such as a keyboard, touch screen, mouse, and the like. It is presumed that one of ordinary skill in the art could appropriately size the components of delegator workstation 20, delegatee workstation 22 and collaborative computing server 24 to accommodate the expected demands placed on these devices during operation of delegation system 16.

Collaborative computing server 24 is arranged to store the databases described herein and executes the software which provides deployment environment 10 and communities 12. In operation, an end user person 14 serving as a delegator operates delegator workstation 20 which communicates with collaborative computing server 24 to delegate designated responsibilities to one or more other end user persons 14. As such, a delegatee end user person 14 uses delegatee workstation 22 to communicate with collaborative computing server 24 to perform functions for which responsibilities have been delegated.

Figure 3:
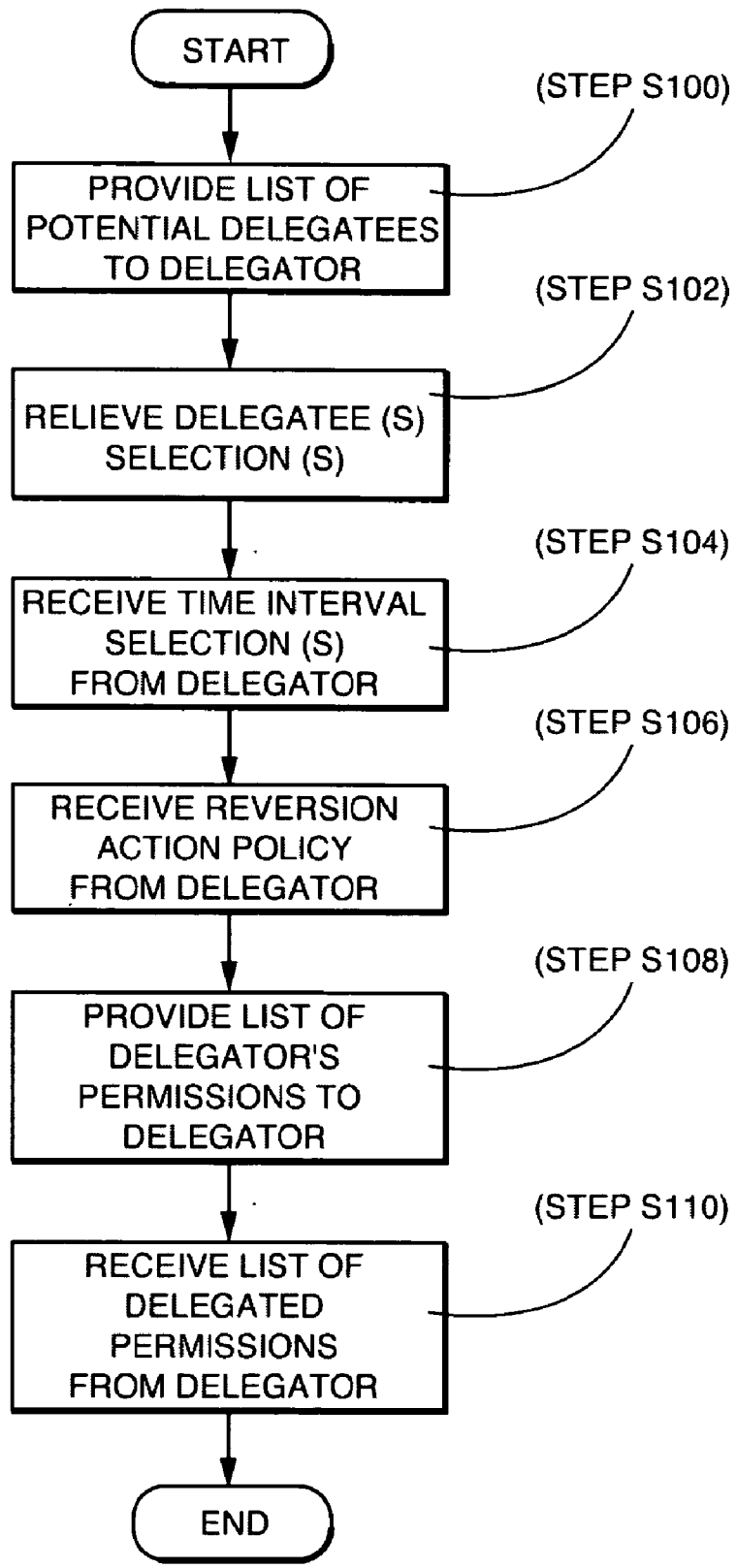
FIG. 3 is a flow chart of the delegation process of the present invention.

The present invention provides a process by which such delegation can be affected. The role delegation process of the present invention is explained with reference to the flow chart in FIG. 3. Initially, collaborative computing server 24 receives an indication from the delegator via delegator workstation 20 that the delegator end user person 14 wishes to delegate his or her permissions (not shown). Collaborative computing server 24 generates and provides a list of potential delegatees to delegator end user person 14 (step S100). The list of potential delegatees can include all end user persons 14 within a community 12 or a subset thereof. For example, delegation system 16 can be pre-configured such that only users within a particular work group within a community 12 can be made available as potential delegatees. Administrators of community 12 and/or deployment environment 10 can be provided on the list of potential delegatees as well.

Delegator workstation 20 displays the list of potential delegatees and provides a facility by which the delegator can indicate one or more delegatees to whom permissions will be made available. The list can be provided using any suitable graphical user interface (GUI) display technique such as radio buttons, check boxes, drop down menus, etc.

The delegator end user person 14 indicates his or her selections using delegator workstation 20 which in turn transmits the selections to collaborative computing server 24. Collaborative computing server 24 receives the delegatee selections (step S102) and stores this data in a database.

Delegator end user person 14 is then prompted to indicate the time interval selection for which each delegatee is granted the responsibilities and privileges (step not shown). Delegation time intervals can be established individually for each delegatee or can be established for all delegatees. It is presumed that one of an ordinary skill in the art can develop the programmatic software code necessary to facilitate indication of delegation time interval from delegator end user persons 14 via delegator workstation 20. The delegated time interval selections are received by collaborative computing server 24 from delegator workstation 20 (step S 104) and this data is stored in a database on collaborative computing server 24.

Delegator end user person 14 is prompted to enter his or her reversion action policy (step not shown). Reversion action policy refers to whether or not the delegatee's role automatically reverts back to the delegator after the selected time interval or whether the delegator must take affirmative action to cause the reversion to occur. The reversion action policy entry can be established for each delegatee or for the entire group and is received by collaborative computing server 24 from delegator workstation 20 (step S106). The reversion action policy data is stored in a database in collaborative computing server 24.

Of note, although delegatee selection, time interval selections and reversion action policies are described herein as discreet steps, it is contemplated that one or more of these actions can be indicated on a single display screen and received by collaborative computing server 24 in an integrated fashion.

Collaborative computing server 24 provides a list of the delegator's permissions via the display on delegator workstation 20 (step S108). An example of a list of delegator's permissions provided to a delegator end user person 14 is described with reference to FIG. 4. FIG. 4 shows an exemplary delegatable privileges selection computer screen display 26 provided, for example, on delegator workstation 20. Delegator end user person 14 indicates delegated permissions by selecting one or more radio buttons 28 corresponding to the permissions delegator end user person 14 wishes to delegate to the previously selected delegatees. Delegator end user person 14 can delegate all permissions or a subset of permissions. An exemplary list of permissions is shown on screen display 26. Of course, the actual permissions displayed will vary for each delegator depending on his or her permissions existing at the time of delegation. It is presumed that one of ordinary skill in the art can develop the appropriate software code for delegation system 16 necessary to provide delegatable permissions screen display 26 on delegator workstation 20.

Once delegator end user person 14 has selected the desired radio buttons 28, delegator end user person 14 indicates acceptance of these selections by selecting enter button 30. Delegator end user person 14 can cancel the delegation operation by selecting cancel button 32. Of note, although the delegation permission selection is shown using radio buttons 28 on screen display 26, it is contemplated that one of ordinary skill in the art could arrange the information in any fashion suitable for providing the list of delegatable permissions to the delegator and receiving an indication at collaborative computing server 24 as to the delegated permissions.

Referring again to FIG. 3, once the delegating end user person 14 has made his or her selections and selected enter button 30, collaborative computing server 24 receives the list of delegated permissions (step S110) from delegator workstation 20 via computer network 18. Data corresponding to the delegated permissions is stored in a database on collaborative computing server 24. One or more of the data corresponding to the selected delegatees, the delegated time interval selections, the reversion action policy and the list of delegated permissions comprises a delegation policy put in place for the corresponding community 12 for delegator end user person 14.

The present invention therefore advantageously allows a user to establish a delegation policy in a manner which overcomes the deficiencies of the prior art by allowing a delegator to select not only one or more delegatees for specific privileges, but also to indicate a reversion policy so that the delegator can re-assume the responsibilities and privileges without the need for the delegator to contact another administrator to affect privilege reversion or to have to configure delegation systems 16 upon his or her return.

The present invention can be realized in hardware, software, or a combination of hardware and software. For example, the data corresponding to the delegates, delegated privileges and delegation time intervals can be stored in a database, such as a database within collaborative computing server 24. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein. For example, the data handling policy can be stored in a database.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

We claim:

1. A computer-readable storage medium storing a computer program which when executed performs a collaborative computing permission delegation method comprising:
   selecting a delegatee from a list of potential delegatee end user persons and further selecting a delegatable permission from amongst a listing of delegatable permissions held by a delegator;
   storing the selected delegatable permission in connection with the selected delegatee as a delegation policy;
   applying a time duration to the delegation policy limiting a duration of delegation of the selected delegatable permission; and,
   delegating the delegatable permission to the selected delegatee as provided by the delegation policy for the applied time duration.

2. The computer-readable storage medium of claim 1, wherein the delegation policy further includes a reversion action policy, the reversion action policy indicating whether or not the delegated permissions reverts back to the delegator at the end of the time duration.

3. The computer-readable storage medium of claim 1, wherein the method performed by the stored computer program when executed further includes updating a database having permission data defining access to resources within a collaborative computing environment community to grant the delegatee access to the resources in accordance with the delegated permissions.

4. The computer-readable storage medium of claim 3, wherein access to resources includes the ability to define access policy for end user persons other than the delegator and the delegatee.

5. The computer-readable storage medium of claim 1, wherein the delegatable permissions correspond to permissions for a collaborative computing environment role.

6. A system for permission delegation in a networked collaborative computing environment, the system comprising:
   a delegator workstation; and
   a collaborative computing server in data communication with the delegator workstation via the network, the collaborative computing server:
   selecting a delegatee from a list of potential delegatee end user persons and further selecting a delegatable permission from amongst a listing of delegatable permissions held by a delegator;
   storing the selected delegatable permission in connection with the selected delegatee as a delegation policy;
   applying a time duration to the delegation policy limiting a duration of delegation of the selected delegatable permission; and,
   delegating the delegatable permission to the selected delegatee as provided by the delegation policy for the applied time duration.

7. The system of claim 6, wherein the delegation further includes a reversion action policy, the reversion action policy indicating whether or not the delegated permission reverts back to the delegator at the end of the time duration.

8. The system of claim 6, wherein the system further comprises a database in operative communication with the collaborative computing server, the database having permission data defining access to resources within a collaborative computing environment community to grant the delegatee access to the resources in accordance with the delegated permission.

9. The system of claim 8, wherein the collaborative computing server updates the database in accordance with the delegation policy.

10. The system of claim 8, wherein access to resources includes the ability to define access policy for end user persons other than the delegator and the delegatee.

11. The system of claim 6, wherein the delegatable permissions correspond to permissions for a collaborative computing environment role.

* * * * *